United States Patent [19]
Denio et al.

[11] Patent Number: 5,269,021
[45] Date of Patent: Dec. 7, 1993

[54] MULTIPROCESSOR SOFTWARE INTERFACE FOR A GRAPHICS PROCESSOR SUBSYSTEM EMPLOYING PARTIALLY LINKED DYNAMIC LOAD MODULES WHICH ARE DOWNLOADED AND FULLY LINKED AT RUN TIME

[75] Inventors: Michael A. Denio; William S. Egr; Douglas C. Crawford; Michael D. Asal; Graham Short, all of Sugar Land; James G. Littleton, Houston; Jerry R. Van Aken, Sugar Land, all of Tex.

[73] Assignee: Texas Instruments Incorporated, Dallas, Tex.

[21] Appl. No.: 420,409

[22] Filed: Oct. 12, 1989

[51] Int. Cl.⁵ .............................................. G06F 15/16
[52] U.S. Cl. ........................... 395/700; 364/DIG. 1; 364/280; 364/281.3; 364/281; 364/281.8
[58] Field of Search ... 364/900 MS File, 200 MS File; 395/700

[56] References Cited

U.S. PATENT DOCUMENTS 4,587,629  5/1986  Dill et al. ............... 364/900
4,882,674  11/1989  Quint et al. ............ 364/200

Primary Examiner—Gareth D. Shaw
Assistant Examiner—A. Katbab
Attorney, Agent, or Firm—Robert D. Marshall, Jr.; Richard Donaldson; Jay M. Cantor

[57] ABSTRACT

An interface for use with a multiprocessor computer system, having a host processor system and a graphics processor system. The interface permits extended functions to be developed on the host system or on another system, and subsequently loaded to the graphics processor system. The interface comprises software residing on both the host system side and the graphics system side, which operates at run time to permit the function to be called from a main program running on the host. The function's arguments are passed to the graphics system so that the function is executed by the graphics processor.

11 Claims, 7 Drawing Sheets

MULTIPROCESSOR SOFTWARE INTERFACE FOR A GRAPHICS PROCESSOR SUBSYSTEM EMPLOYING PARTIALLY LINKED DYNAMIC LOAD MODULES WHICH ARE DOWNLOADED AND FULLY LINKED AT RUN TIME

TECHNICAL FIELD OF THE INVENTION

This invention generally relates to computer processing, and more particularly to a software interface for a system having both a host and a graphics processor.

BACKGROUND OF THE INVENTION

Present day computer systems that use graphics displays have a number of different architectures. Some systems use a host processor and a display controller. These are essentially hard wired, bit-mapped systems that require the host processor to perform all the graphics processing. A disadvantage of such systems is that as graphics demands, such as resolution, increase, so does the processing burden on the host, which results in decreased processing speed.

As an alternative to display controllers, other systems have transferred graphics processing tasks to a graphics processor subsystem. Some such systems rely on dedicated hardware implementations of graphics functions. Other graphics processor subsystems use a programmable graphics processor, which permit a programmer to add functionality.

Although graphics processor subsystems permit higher resolution and faster execution, a disadvantage of many such systems, both hardwired and programmable, is that they are not easily extensible. Even those subsystems that have programmable processors are difficult to integrate with the host system and its application programs, and for this reason are essentially fixed function systems. Such systems attempt to be as general as possible, and tend to have a "wheel of reincarnation" effect, resulting from adding so many functions to the subsystem that functionality comes at the expense of efficiency. Another problem with systems that have a fixed set of functions, or that are difficult to extend, is that they do not keep pace with graphics software, for which new graphics algorithms are continually evolving.

In addition to extensibility, a consideration in designing graphics systems is standardization. From the hardware manufacturer's point of view, the goal of a graphics standard is to permit a graphics system to be used with many applications programs. From the software developer's point of view, a standard should permit a program to run on any graphics system. Many standards, such as the CGA, EGA, and VGA, are directed to a single processor system, rather than a graphics subprocessor system, and although they are successful in interfacing software with graphics hardware, do not provide an interface between the host and graphics system.

Thus, a need exists for a graphics subsystem interface that provides extensibility without compromising efficiency. Furthermore, the mechanisms for implementing extensibility should provide an interface to which both applications programmers and hardware manufacturers may direct their products. The interface must be sufficiently high level to encourage standardization, yet sufficiently low level to promote processing speed.

SUMMARY OF THE INVENTION

One aspect of the invention is a method for extending the functions to be executed by a graphics processor subsystem but called from a main program running on a host processor system. The basic steps of the method are creating a subprogram to be executed by the graphics processor, defining the subprogram so that its arguments may be passed at run time, compiling or assembling the subprogram for the graphics processor, loading the subprogram to the graphics processor, and linking the subprogram to previously loaded functions.

Another aspect of the invention is a method of using a graphics subsystem in a host computer system. The method comprises the basic steps of using the graphics subsystem to provide a set of primitive core functions, using a host system to download extended functions to the graphics subsystem, using a software interface to pass arguments from the host system to the subsystem, and using the graphics subsystem to execute the extended and the core functions.

A hardware aspect of the invention is a multiprocessor computer system for executing a single software program on a first processor, such that the program may call designated functions to be executed by a second processor. The system comprises a programmable host processor system, a programmable graphics processor system, wherein the host system uses a software interface that permits extended functions to be downloaded to and executed by the graphics processor.

Another aspect of the invention is a software interface for interfacing a host processor and a graphics processor subsystem of a multiprocessor computer system. The invention includes various software programs, which operate on data provided by an applications program, so that the applications program may call functions to be executed by the graphics processor.

A technical advantage of the invention is that it permits a graphics subsystem to be both efficient and easily extensible. Speed of execution is optimized because software developers may create a tailored set of graphics functions that best suits the application. A further advantage of the invention is that it standardizes the methodology used to extend the functionality of a graphics subsystem. It provides an interface to which both hardware manufacturers and software developers may direct their products.

BRIEF DESCRIPTION OF THE DRAWINGS

The novel features believed characteristic of the invention are set forth in the appended claims. The invention itself, however, as well as modes of use and further advantages, is best understood by reference to the following description of illustrative embodiments when read in conjunction with the accompanying drawings.

DETAILED DESCRIPTION OF THE INVENTION

Figure 1:
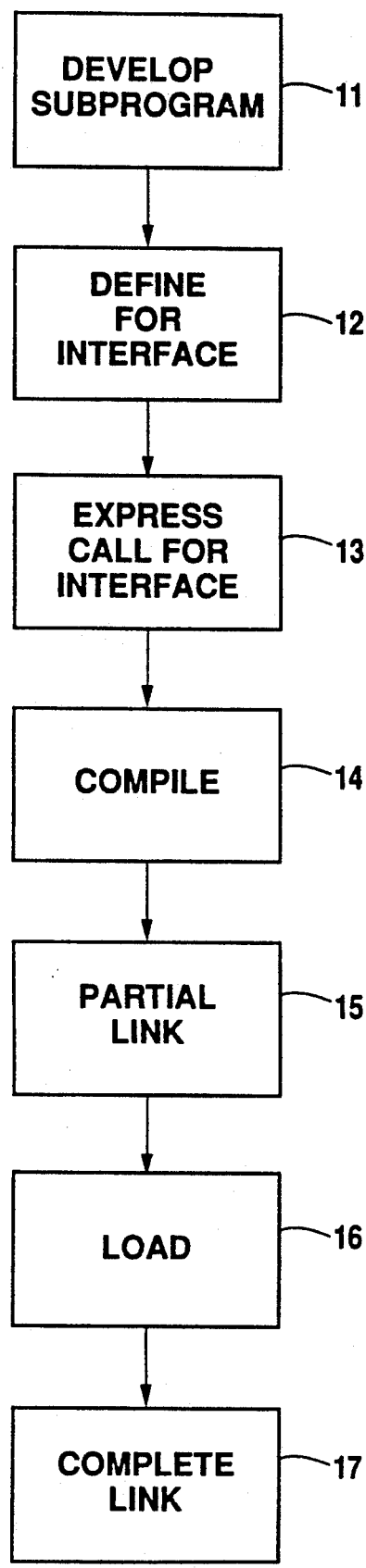
FIG. 1 is a flow diagram representing the steps of extending the functionality of a graphics subsystem.

The hardware environment in which the invention operates is, in general terms, a multiprocessor computer system having at least two processors: a host processor and a processor for graphics processing. The applications for such systems are high resolution graphics, such as computer aided design, desktop publishing, imaging, and presentation graphics. The hardware aspects of the invention are discussed in detail in connection with FIG. 3.

One of the advantages of the invention is that a main software program, written in a single language, may be run on the host system, but may call designated functions to be executed by a graphics processor. Implicitly, therefore, the processors used with the invention may be programmed in a high level language, which may be the same language for both processors. Thus, each processor is associated with its own instruction set and a compiler to produce the lower level language of that processor.

An underlying concept of the invention is that graphics functions to be executed on a graphics subsystem are best implemented in two groups: core primitives and extended functions. The core primitives are available from the graphics processor at all times. These core primitives include a few fundamental graphics utility functions, but also include functions for system initialization, graphics attribute control, memory management, screen clearing, cursor handling, communications, and extensibility. The extended functions are loaded as needed to provide graphics functions used by an application program.

The following description of the software aspects of the invention is primarily directed to programs written in the C programming language. However, the programming environment in which the invention will operate is not unique to C, and the programming structure and functionality described herein can be readily translated into any high level language. The specific implementations are considered to be within the ability of a programmer having ordinary skill in the art after having reviewed the present specification, and the present disclosure is made to enable implementation of the invention in the myriad of languages and systems presently available for various applications.

The extended functions may also be easily programmed in assembly language, in which case the they are called in the same manner. The same methodology is used, except that the extended function code is assembled rather than compiled. Thus, for purposes of this description, "assembled" may be substituted for "compiled".

The "user" of the invention may be various persons who provide parts of a multiprocessor system. For example, the user may be a software developer who desires to add extended functions for an application or driver being prepared for use on the system. Or, the user may be a programmer who simply supplies extended functions for use by other programmers. Alternatively, a hardware manufacturer, such as a board manufacturer may program functions for the graphics system. The user may be someone actually running a program that uses the interface. Furthermore, as is characteristic of computer methods and programs, the user may be other software running on the computer.

For purposes of this description, subprograms such as those a user might desire to add to a multiprocessor system, are referred to as "extended functions". The system running the main program is referred to as the "host processor system" or "host system", with its processor referred to as the "host processor". The system on which the extended functions are to be executed is the "graphics processor system", with its processor referred to as the "graphics processor" or "graphics system processor (GSP)".

FIG. 1 is a block diagram illustrating the basic steps of creating an extended function for use with a multiprocessor system, which has a host and a graphics processor. Using this method, graphics functions not included in the core primitives may be created by a programmer. These extended functions are incorporated into a dynamic load module ("DLM"), to be used by an end user who downloads them to the graphics system, typically, at initialization time. They may then be called from a main program being executed on the host system.

The basic steps of the method are developing a subprogram appropriate for execution by the graphics processor, defining the subprogram so that its arguments may be passed during execution, compiling the subprogram for the graphics processor, and partially linking the subprogram to form a DLM. Eventually, the DLM is downloaded to the graphics processor, where it is linked with existing subprocessor functions and core primitives.

In Step 11, a programmer develops a subprogram having at least one, and typically a number of, functions that are appropriate for execution by the graphics processor. These functions may be written in a high level language or assembly language. A feature of the invention is that the extended functions may be written in the same language as the main program and compiled or assembled for the graphics processor. The function definition is herein referred to as its "code", as is other computer programming used to implement the invention.

In step 12, the subprogram is defined in a manner that enables the subprogram arguments to be passed to the graphics processor during run time. Step 13 is related to step 12, in that the subprogram's call in the main program must be expressed in a form understandable by the definition of step 12. There are at least two different methods of accomplishing steps 12 and 13. These methods are described in copending patent applications, entitled "Partitioning Software in a Multiprocessor System" U.S. Pat. application Ser. No. 07/420,085 filed Oct. 11, 1989, and "Extended Software Functions for a Multiprocessor System" U.S. patent application Ser. No. 07/419,999 fled Oct. 11, 1989, assigned to Texas Instruments, Inc. The "Partitioning" application describes a packet method of adding extended functions to a multiprocessor system, and the "Extended Functions" application describes a direct method. The disclosures of both applications are incorporated by reference herein.

The packet method is designed to allow the graphics system to be extended with the smallest amount of programming effort on the part of the user. The method permits functions that have been written in a higher level language, such as C, to be called from a main program running on the host system and executed by the graphics system. In fact, as explained in the copending application, the packet method permits a user to move a function that runs on the host system to the graphics system, invoking it with the same parameters. In the packet method, the function's arguments are sent in packets that describe the size and type of data being sent.

The original program is split into output files representing the partitioned program. The output files are compiled and linked to run on the respective processors. Each output file contains some sort of common implementation of each function, for example, in the form of a call or a definition, as described in the method above. At run time, the main program may be run on a first processor, where function calls to function loaded to the second processor will invoke a parameter handler program. The parameter handler is programmed to recognize the restructured arguments and to accept the argument data in a meaningful way to the second processor.

Although these steps may be performed manually, such as by an applications programmer, other computer programs may be written such as a utility program, to perform these steps with a computer. For example, the user might insert into the main program, special indicators to identify which modules are to run on which processor and to automatically restructure the programming. More specifically, a #define generator could involve a combination of artificial intelligence techniques and user queries to correctly determine information such as the size of indirectly referenced data. Then, once the above steps are taken, the module can be called from the main program, using that language's standard calling syntax. A compile time conversion changes the standard calling syntax into the desired restructured form.

The function call is restructured with a #define directive, with the result being a packet form of the function arguments. In the packet form, each argument is a packet, which has a packet header and packet data. The packet header has two elements: a type identified and a size identifier, which describe the type and size of the argument data being sent. At run time, this packet form permits the data to be delivered to the memory of the graphics processor in a form that the graphics processor recognizes. At the graphics processor, the packets are reconverted to the standard argument format. Thus, the packet form permits the function call to be understood by both processors.

A feature of the packet embodiment is that converting arguments to packet form is simplified by the use of additional defines in other include files, which represent a number of data types. The following is an illustrative list of data types and their application:

| | |
|---|---|
| _WORD (a) | immediate WORD argument a |
| _SWORD (a) | immediate signed WORD argument a |
| _DWORD (a) | immediate double WORD argument a |
| _BYTE_PTR (b,a) | BYTE array pointer a with b elements |

| | -continued |
|---|---|
| _WORD_PTR (b,a) | WORD array pointer a with b elements |
| _DWORD_PTR (b,a) | DWORD array pointer a with b elements |
| _STRING (a) | Null-terminated string pointer a |
| _ALTBYTE_PTR (b,a) | function altered BYTE array pointer |
| _ALTWORD_ptr (b,a) | function altered DWORD array pointer |
| _ALTDWORD_PTR (b,a) | function altered DWORD array pointer |

The above data types permit the packet to communicate to the second processor whether the argument is immediate or referenced indirectly in the first processor's memory. If the argument is memory referenced, it is translated into a form that the second processor can access.

In the packet form embodiment of the invention, the result is an include file entry that represents the module in question in the following form:

```
#define gobal_function_name (argument1,
    argument2,...argumentn)
entry_point_name
(command-NUMBER, NUMBER-of-PACKETS
packet1, packet2, ... packetn),
``` where each packetn has the form packet_header (packet_data). An advantage of the packet embodiment of the invention is that the user need only add this single preprocessor statement to the original program and need not make any other program changes.

A particular advantage of the packet form of the invention is that converting the subprogram is accomplished by simply recompiling the unmodified subprogram for the second processor. The subprogram definition for the second processor. The subprogram definition for the second processor is the same as in the original program.

Using the packet form embodiment, the partitioning method is quite simple to perform. The programmer may select and identify the desired module, add an include file entry to the main program using the #define directive, and recompile the module for the second processor. The functions to be partitioned are unmodified in source form on the first processor, and in both source and object form on the second processor.

A further feature of the invention is the a #define generator could be created with a utility program to automatically restructure the main program call. Such a feature would permit the method to be implemented with only the steps of developing the program, selecting the subprogram to be run on the second processor, using the #define generator, and recompiling the subprogram on the second processor.

Implicit in moving argument data to the communication stack is physically communicating the stack 414 to the graphics processor system 320, which involves communication over the physical link between the processor system interface, which are described in connection with FIG. 3. The result is a communications buffer 323 in the graphic processor system 320 that contains data and packet information referenced by the stack 414 of the host processor system 310. If one of the parameters is a reference, such as a pointer, the reference itself is not copied over, only the data that is referenced by the pointer is copied.

Figure 6:
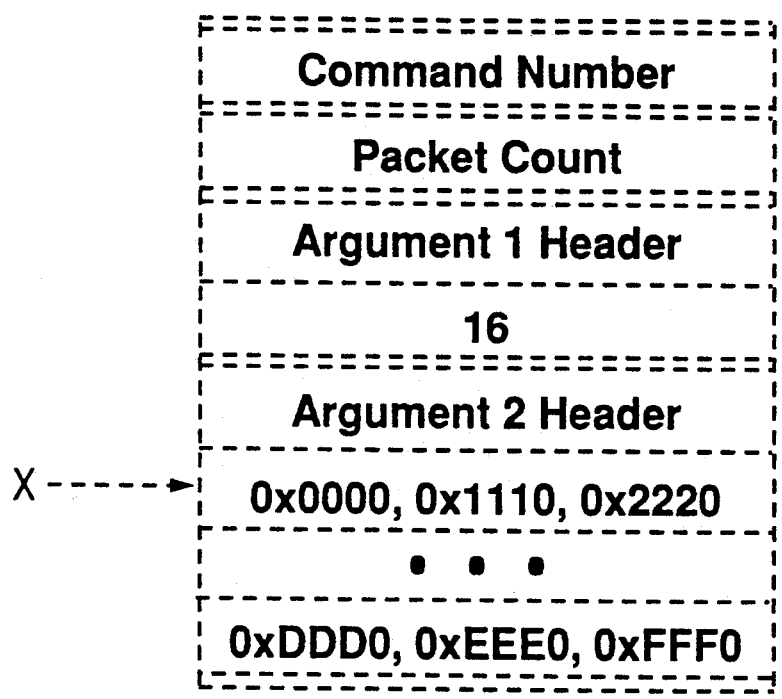
FIG. 6 is an example of a communications buffer, to which arguments have been passed in accordance with the run time method of the invention.

Argument handler 441b read the data in each packet from communications buffer 323 and places it on the graphics processor's stack 423. Referring to FIG. 6, first, argument handler 441b reads and saves the command number, and reads the packet count. The first argument is found to be an immediate reference, detectable by its header, and the data value, 16, is pushed onto stack 423. The second argument is seen to be a pointer value, detectable by its header. Because the argument handler 441b expects to read a pointer and not a string of immediate data, it pushes the pointer to the data in the communication buffer 323, which is labeled "X" and FIG. 6, onto stack 423. In this manner, the data string is converted back into pointer form.

Next, the function invoked referenced by the command number passes as an argument. Once the arguments have been copied over, the command number is used to reference a pointer to the desired function via a global table. The function may now be called with the C compatible stack 423 it was compiled to expect.

The direct method does not place the arguments on the stack, as does the packet method. The function is invoked by the graphics subsystem with a single argument, which is a pointer to a communication buffer where the host downloads the function's arguments. The function contains additional code, which instructs the graphics processor to get the parameters from the buffer and match them to local variables. The function is called from the main program using a direct entry point method, in which the entry point determines the format of the function's arguments and return requirements, if any. These direct entry points are described in detail in the copending "Extended Functions" application. The invention is based on a premise that to use extended functions on a multiprocessor system, the host system and the subsystem must have a means for communicating arguments and return values, if any. Yet, arguments and return requirements are two properties that can vary greatly, and thus require different communications programming to handle such transfers. The function's return requirements determine whether the function need no return value, needs a return value, or modifies variables. The format of the function's arguments, including its argument types, determine how the arguments are passed on the stack.

A basic concept of all aspects of the invention is that a multiprocessor system can accommodate functions having different properties by providing special entry points. An entry point of a subprogram is where the subprogram accepts messages, and is any instruction that may be executed after an instruction not in the subprogram. In the invention, the entry point is used to establish certain properties of data to be exchanged between processor so that both processors know what to expect.

In accordance with this concept, with respect to an extended function's return requirements, the invention accommodates the following cases:

Case 1. No host processor data is modified and no return value is required.

Case 2. No host processor data is modified, but the host requires a return value from the subprocessor.

Case 3. Host processor data is modified by the subprocessor and must be retrieved from subprocessor memory into host memory after the command has executed.

In terms of speed of execution, Case 1 is fastest, Case 2 is slower, and Case 3 is slowest.

With respect to the extended function's argument format, the invention accommodates both immediate reference and reference by one level of indirection, more specifically, the following cases:

Case 1. Argument list with immediate arguments.

Case 2. Argument with pointer(s) to array or structure.

Case 3. Pointer to null terminated string.

Case 4. Argument list with immediate arguments and pointer(s) to array or structure.

As explained below, the argument format affects how the argument data is passed, but generally, rather than passing arguments on the stack, the invention operates by using a pointer on the stack to fetch argument data from a communications buffer.

Because functions may exhibit numerous combinations of return requirements and argument formats, the invention provides entry points that represent combinations of the two sets of cases listed above. The result is a set of entry points that represent various combinations of return requirements and argument formats. This set of entry points is used to ensure that the argument data loaded to a communications buffer by the host processor has the properties expected by the subprocessor system. Each entry point is an entry point to programming associated with the communications system that handles the transfer of data to and from the communications buffer. In the direct method embodiment, each entry point is further associated with an entry point command, which is used to invoke the communications programming.

The user selects an entry point from a number of entry points recognized by the communications system. As discussed above, these entry points are each associated with certain communications programming that handles the transfer of data between processors. In the preferred embodiment, each entry point is associated with a command, which is common to both the entry point code in the subprogram and its call in the main program. The entry point is, in effect, a function whose arguments are the extended function's identifier and information about is arguments.

The user defines the function to match the selected entry point. In other words, the function's arguments and return requirements are coded in accordance with the selected entry point. Immediate formats are designed to be used when a function needs to pass only a small number of arguments. In this case, the value of each argument is placed in the communications buffer with a pointer to fetch them. Indirect reference formats are designed to be used when the function passes a large number of arguments. In this situation, the arguments are assembled into an array in memory and passed sequentially to the communications buffer, with a pointer to the array to fetch them from the buffer.

A function call is added to the main program of the host processor. A means for invoking the appropriate entry point when the function is called is required, which in the preferred embodiment is accomplished with a preprocessor that directs the programming to the entry point when the extended function is called.

As a result of the above steps, a module containing at least one extended function may now be compiled and linked to the main program. It may be loaded to the graphics processor system such that during run time, the main program calls the function, which is then executed by the graphics processor, with this exchange of processors being invisible to the computer user.

Figure 7A:
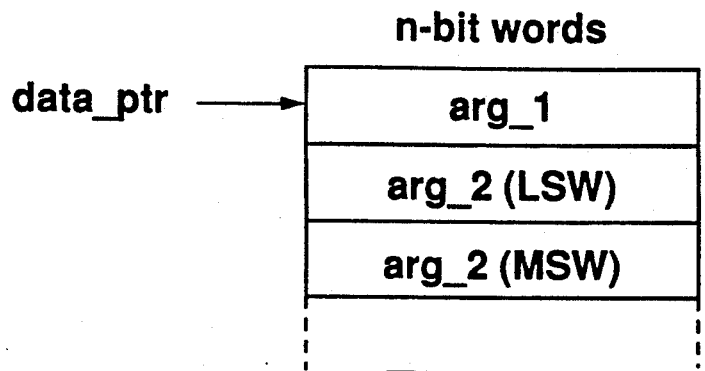
FIGS. 7a, 7b and 7c illustrate a communication buffer used to transfer argument data of the function to be executed by a subprocessor of the system of FIG. 3.
Figure 7B:
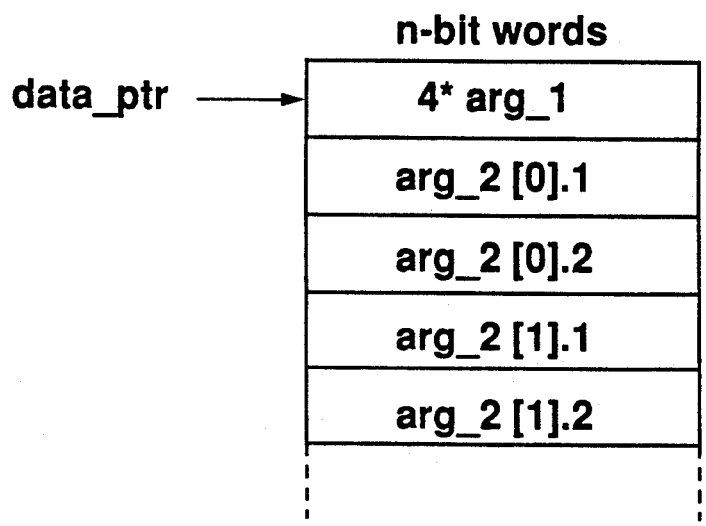
Figure 7C:
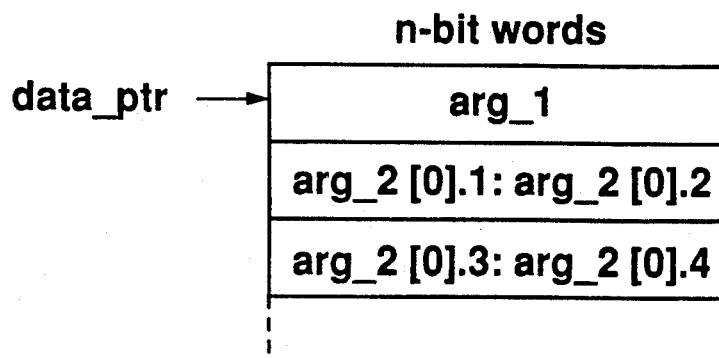

Again, an aspect of the direct method embodiment is that the communications code for passing the extended function's data is in response to an entry point associated with the extended function's properties. FIGS. 7a, 7b, and 7c illustrate data in communications buffer 323 for the entry points Standard, Standard Memory Send, and Standard Memory Return, respectively.

Graphics processor 321 may then execute the function. The pointer is used to retrieve the function's argument data from communications buffer 323 into the local variables of the extended function. Additional steps may involve returning values to host processor system 310 and modifying values used by host processor 311. It can be seen that each entry point is associated with communications programming that instructions subprocessor 321 how to transfer the return valves and where to put them if the function's return requirements, and its associated entry point, call for these tasks to be performed.

Figure 8:
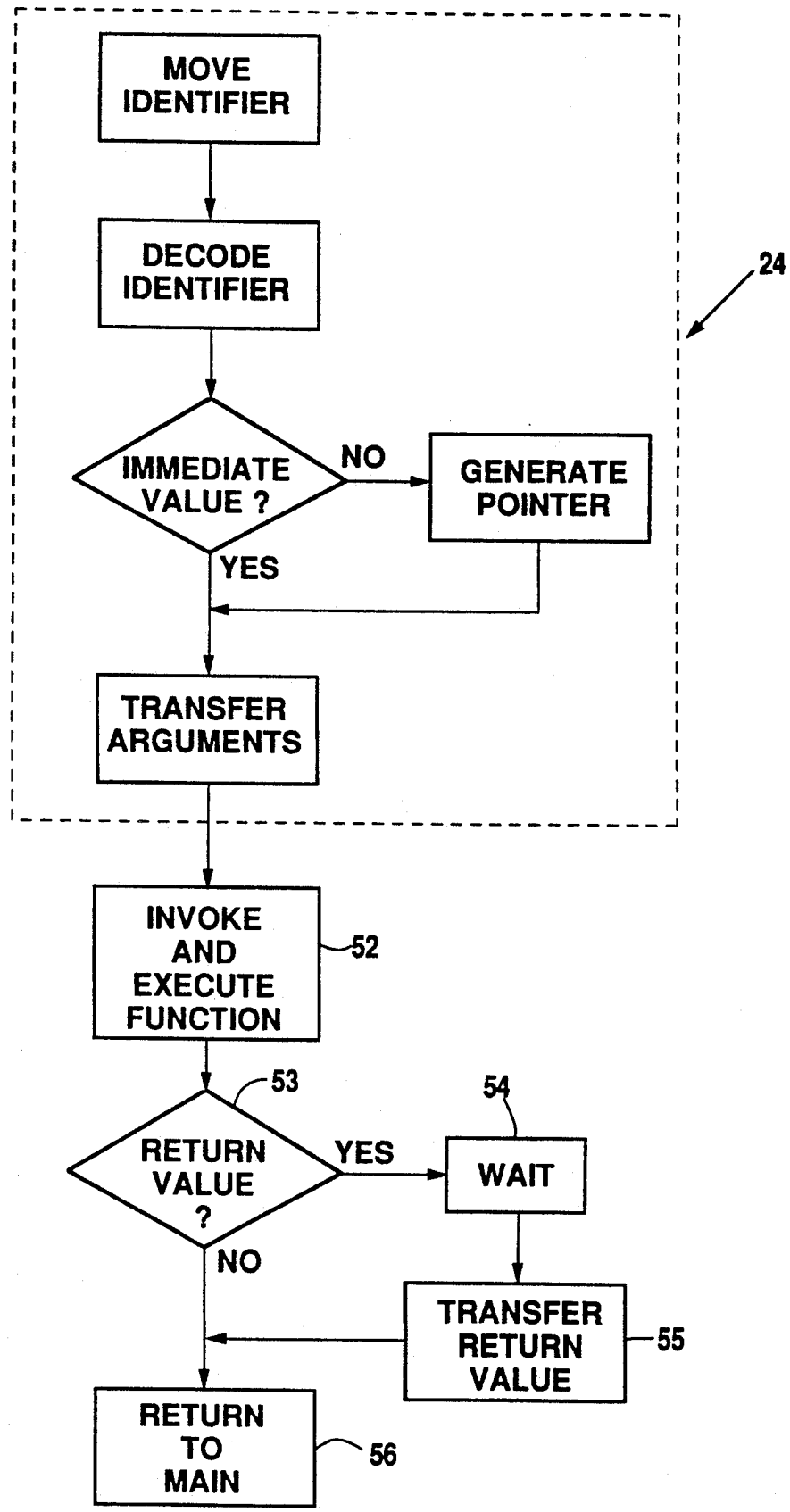
FIG. 8 is a block diagram illustrating a substep of FIG. 1 and post downloading activity on the graphics processor.

FIG. 8 is a flow diagram illustrating Step 24 of the run time method, including its substeps and subsequent steps that occur on the graphics processor system 320. As explained above, Steps 52-56 comprise executing the function and if an entry point associated with a return value has been used, the method includes waiting for and returning this value.

A feature of the invention is that, to enhance run time speed subprocessor system 320 does not check the size of the argument data being transferred to communications buffer 323. However, if large amounts of data are expected to be transferred, and buffer 323 is a fixed size, programming is needed to ensure that the data being transferred does not overflow communications buffer 323.

For example, a routine may be created to check the size of the parameters and download them to the subprocessor system 320 if they will fit. If they will not fit, the programming attempts to locate a temporary buffer from the heap pool to store the parameters. If the allocation is not successful, an error function is invoked. One implementation of an overflow prevention enhancement is an additional set of entry points, to be used when the argument data has the potential of being too large for communications buffer 323. These entry points have the same function as those above, but invoke additional programming that makes a preliminary pass through the argument data to check its size. If the data will not fit, the programming attempts to allocate a temporary buffer from the heap pool to store the parameters. Step 14 is compiling the subprogram for the graphics processor. Of course, if the subprogram is written in assembly language for the graphics processor, step 14 is assembling the code. The techniques of compiling and assembling are well known.

Steps 15-17 involve partial linking and loading of the subprogram. The implementation of these steps is described in a copending application, entitled "Load Time Linker for Software Used with a Multiprocessor System" U.S. patent application Ser. No. 07/420,491 filed Oct. 12, 1989, assigned to Texas Instruments, Inc. This application is incorporated by reference herein. Because a significant feature of the invention is that extended functions may be loaded and linked at run time in response to the requirements of a particular application program, the linking and loading steps are referred to herein as "dynamic downloading".

With respect to linking and loading steps of the invention, the following description refers to operations and structures that are common to software programming that performs these tasks. In particular, the linker is assumed to create object files in a common object file format (COFF), which is a format well known in the art. This format encourages modular programming, each module having smaller blocks of code and data, which are referred to as sections. A section is the smallest relocatable unit of an object file, and will eventually occupy contiguous space in the memory where it is loaded. The COFF format permits the extended functions to be written in one of numerous high level languages or in assembly language. It should be understood, however, that COFF is just one type of object format sufficient to create relocatable partially linked, function modules.

After the functions are defined, they are collected, compiled or assembled, and linked into some form of loadable code such as a series of common object files. An example of the result is a file called myfuncs.obj, which contains two functions, my_func1 and my_func2.

An advantage of the invention is that modules of extended functions may be created by the same programmer who creates the applications program that will use them. Thus, the module to be loaded for use during the run of a particular application need only contain those functions required by the application. Furthermore, the manner of calling the function and its parameterization are the programmer's choice, subject to any special techniques required for interprocessor parameter passing.

A reference section as created, which declares an address reference for each extended function in the module created. An example is the following programming, which references the two functions my_func1 and my_func2:

```
;External References
    .glob1 - my_func1, -my_func2
;Start section declaration
    .sect   ".EXT"
    .long   _my_func1  ;command number 0 within module
    .long   _my_func2  ;command number 1 within module
    .text              ;end section
```

The command numbers declare the functions in the load module to be defined in a particular order. This provides a means for referencing the function. Specifically, a function's command number can be incorporated into a function call in an applications program that calls the function. The reference section is compiled or assembled to generate a common object format file, for example ext.obj.

The module created is partially linked with the reference section created to form a load module. This linking step resolves references among functions within the module, but it is to be understood that the module may contain functions which reference, or are referenced by, functions external to the module. If there are external references, the linking is only partial and the reference is unresolved. The partially linked file must have relocation information and symbolic information. The partial linking is concerned with the formation of output sections and not with allocation. All allocation, binding, and memory directives are performed during a subsequent link at run time.

An example of partial linking is when the module has a function that calls a core primitive. The unresolved reference is external to the module, being already stored in the subprocessor system, and the referencing function has no address for it. The essential feature of the linker is that it allows functions to have calls that cannot be resolved until run time. When the functions are loaded into memory of the subprocessor system these calls resolved. A dynamic linker resolves the calls by inserting addresses into the code.

In accordance with the methodology of the load time linker described in the copending application, Step 15 is partially linking the subprogram to form a DLM. This partial linking step resolves all references to variables and functions that are internal to the subprogram. Those variables and functions referenced externally by the subprogram are left unresolved. Step 16 is loading the DLM to the graphics system. In the preferred embodiment, loading occurs at run time, so that the applications program may be marketed separately from the hardware with which it will be used. Step 17 completes the linking of the DLM and resolves all externally referenced variables and functions resident in the subprocessor system. These resident functions will usually be the core primitives, but may also be other extended functions loaded in accordance with the method of this invention. During the software development stage, steps 16 and 17 may occur on a special test graphics subsystem, rather than on the graphics subsystem on which the application will finally be used. Nevertheless, the test system is assumed to have a graphics processor or emulator, and the method is basically the same. An end user may also perform steps 16 and 17 at run time.

Figure 2:
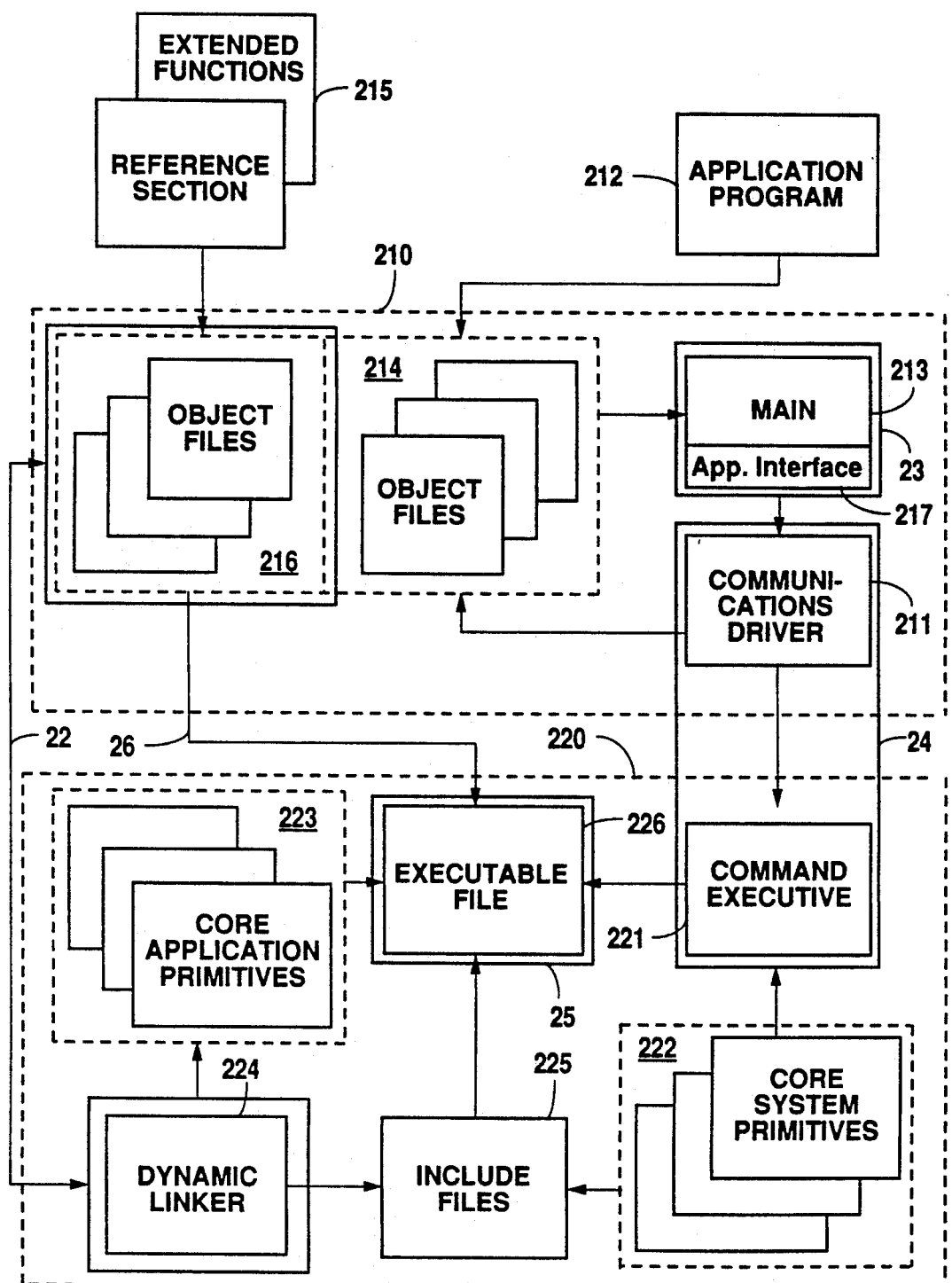
FIG. 2 is a data flow diagram illustrating the steps of using a computer system, having a host and a graphics processor, to execute extended functions.

FIG. 2 illustrates a second aspect of the invention, a method of using a graphics subsystem in a host computer system. FIG. 2 is in the form of a system flow diagram, with the steps of the method being associated with software programs that perform them. In general, FIG. 2 comprises software residing in both host memory 210 and graphics memory 220. The software residing in memory 210 is a communications driver 211, application program object files 214, and extended function object files 216, the latter to be loaded to graphics memory 220 as discussed below. The components labeled 212 and 215 indicate that the application files 214 and the extended function DLM files 216, respectively, have been compiled from source code modules. One of the application files 214 is a main program 213. The software residing in memory 220 is a command executive 221, an executable file 226 of extended function definitions, include files 225, and core primitives 222 and 223, and dynamic linker 224. These components are further described in connection with FIG. 4.

Figure 3:
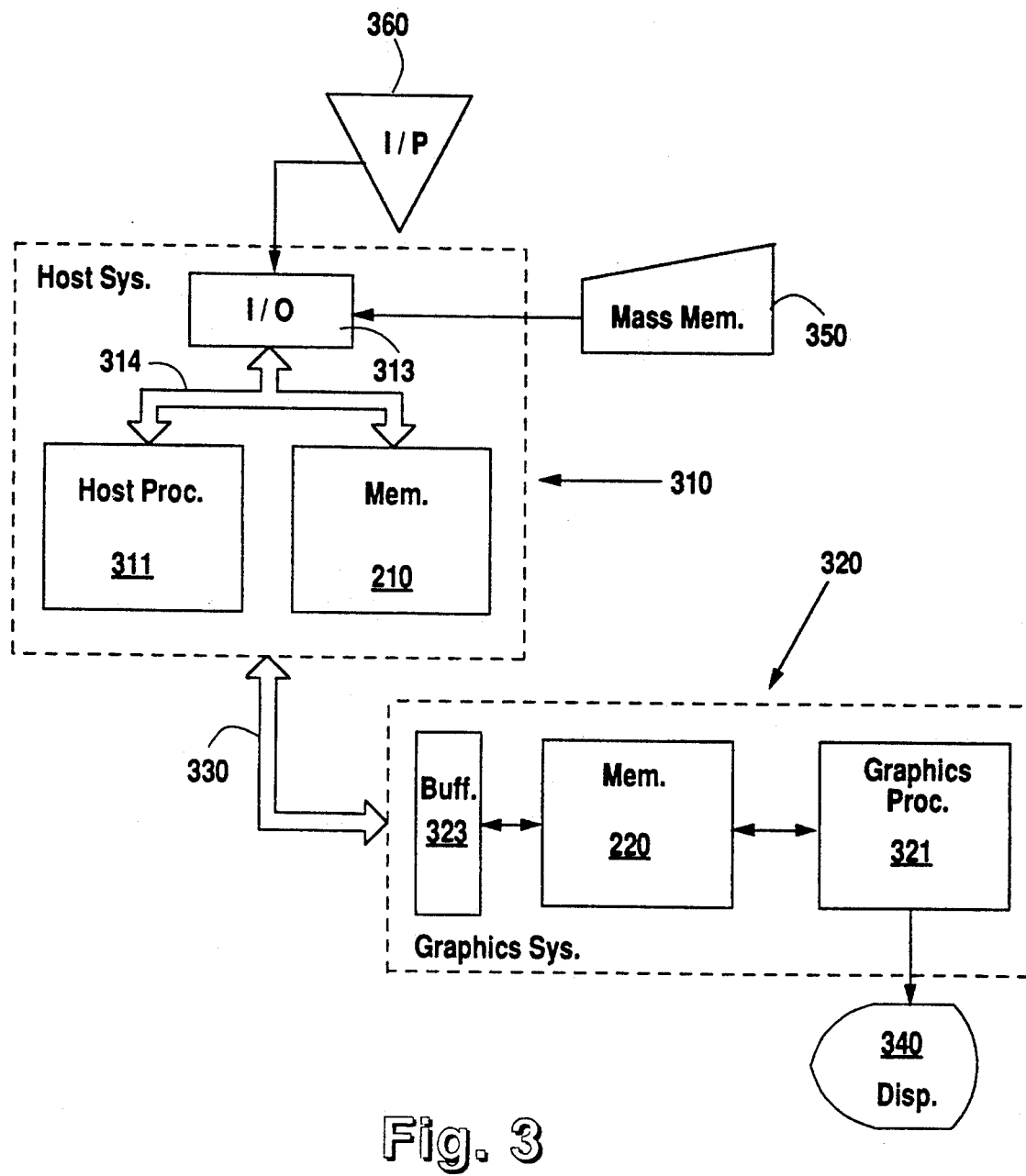
FIG. 3 is a block diagram of a multiprocessor computer system, having a host processor and graphics processor.

The method of FIG. 2 is for use on a multiprocessor computer system having a communication means between processors, and is therefore, best understood with reference to FIG. 3, which is a block diagram of a such a system. The system has both a host processor system 310 and a graphics processor subsystem 320. In the preferred embodiment, the graphics system 320 is configured so that graphics processor 321 can run in parallel with host processor 311, calculating and manipulating graphics information, while host processor 311 continues with other processing tasks.

Typically, host processor 311 is optimized for peripheral management, such as the Intel 80286 and 80386 processors. These processors are used with DOS-based personal computer systems, but the invention is not limited to DOS operating systems. In fact, the methods and mechanisms described herein may be implemented using a variety of processors and operating systems. Memory 210 associated with host processor 311 includes random access memory (RAM), which permits it to access programs that direct its operations.

Graphics processor 321 is designed for graphics processing and is programmable. An example of such a processor is the 34010 graphics processor, manufactured by Texas Instruments, Inc., which is a 32 bit microprocessor with instruction set extensions for graphics processing as well as hardware for display device control and refresh tasks. Memory 220 includes RAM memory so that graphics processor 321 can store programs that instruct it how to process graphics information.

A communication means between the two processors is embodied by bus 330 and communications buffer 323. Bus 330 is bidirectional and provides a data path and control lines. Communications buffer 323 can be accessed by both processor systems 310 and 320, and is explained in detail in connection with FIG. 5. Other hardware implementations of a communications means are possible with the primary requirement being that each processor 311 and 321 have access to communications buffer 323, consisting of message data for handshaking between processors, command identification space to identify the function being called, and data space to pass command arguments and additional data. The configuration shown in FIG. 3 is only one of numerous means for providing interprocessor communications, and other means are easily developed. Furthermore, although FIG. 3 shows the two processor systems, 310 and 320, as having separate memories 210 and 220, the communications means may be a shared memory.

The multiprocessor system of FIG. 3 operates with various standard peripheral devices, notably a display 340, mass storage 350, and input devices 360, such as a keyboard or mouse. An I/O circuit 313 is used to communicate information in appropriate form between these input and output devices and the other parts of host system 310, via a host system bus 314. Input devices 360 permit a user to interact with the host processor system 310. Display 340 is coupled to graphics processor 321 via well known control and I/O techniques.

Referring again to FIG. 2, the method comprises the basic steps of downloading an extended function from DLM files 216 to the graphics subsystem 320, calling the extended function from a main program 213, passing the function's arguments from the host system 310 to the subsystem 320, and executing the extended function. The core primitives are loaded into graphics subsystem 320 prior to the main program 213 making calls to functions resident in subsystem 320. This enables the loading and linking to be performed by graphics processor 321 and also permits certain basic graphics tasks to be called by the extended function.

Because the method of FIG. 2 need not occur until an application program is to be run, the method 2 is referred to as a run time method. It should be understood, however, that the application may be re-run without again loading and linking its extended functions.

Thus, step (FIG. 2) is loading the extended function DLM 216 to graphics memory 220, and linking it to any other code called by it or that it calls. This is accomplished with dynamic linker 224, which is a core function, and which performs the loading and linking steps explained above in connection with FIG. 1.

More specifically, the loading and linking of step 22 permits the extended function DLM 216 to be loaded to memory 220 and linked to other extended functions and core primitives 223 at run time to form an executable file 226. Dynamic linker 224 creates an executable file 226, which contains the extended function, using a symbol table file, which is part of include files 225, to identify the function to the rest of the system. A feature of the invention is that the extended function may be developed on the host system 310 as a module of code 215, and compiled into object files 216 that are downloaded to graphics system 320.

Step 23 (FIG. 2) is calling the extended function, now in the form of an executable file 226, from a main program 213 running on the host system 310. Main program 213 is an executable file derived from object files 214.

Step 24 (FIG. 2) is passing the arguments of extended function 226 from host system 310 to subsystem 320. To accomplish step 24, the host system 310 is supplied with a communications driver 211, and the graphics system 320 is supplied with a command executive 221. The details of communications driver 211 are explained below in connection with FIGS. 4 and 5, but essentially, communications driver 211 contains programs used to communicate between host system 310 and graphics system 320. Command executive 221 is also explained below in connection with FIG. 4. The functionality of both communications driver 211 and command executive 221 accommodates either the packet method or the direct method of passing arguments, or both methods.

Step 25 (FIG. 2) is using graphics subsystem 310 to execute the extended function 226. If the extended function 226 calls a core application primitive 223, step 25 includes executing that primitive.

Step 26 (FIG. 2) of the method is using graphics subsystem 320 to load core primitives 222, 223, and 224, which are always available for calling, into subsystem 320. The core primitives may be grouped into two basic functional types: systems primitives 222 and application primitives 223. The systems primitives 222 include functions for performing such operations as subsystem initialization, output, memory management, communications, and extensibility. The latter type of systems primitives, the extensibility functions, are used in connection with loading and linking extended functions, and include a special program, separately labeled as dynamic linker 224. Application primitives 223 are available to be called from main program 213, after being linked in accordance with the method of FIG. 1. Examples of specific implementations of core primitives 222, 223, and 224 may be found in the publication entitled "TIGA-340 Interface User's Guide", which is published by and available from Texas Instruments, Inc.

Figure 4:
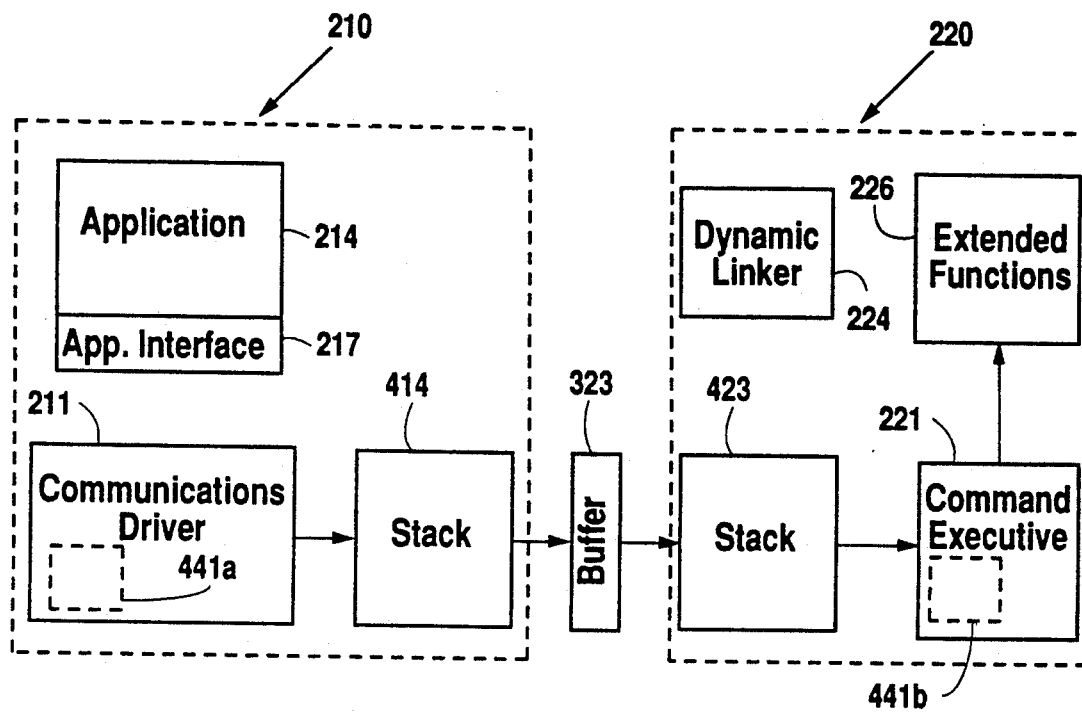
FIG. 4 is a block diagram illustrating a software interface used with the multiprocessor system of FIG. 3.

FIG. 4 illustrates a number of software devices loaded to two different processors, such as processors 311 and 321 of FIG. 3, having memories 210 and 220. Although this description is directed to the use of stacks, in other embodiments of the invention, a structure other than a stack could be used. The essential feature is that an area of memory appears the same to both processors 311 and 321. The structure could also be a shared memory. The commonality of the memory and of the memory contents permit the function call to be easily communicated and understood by both processors 311 and 321.

In general, FIG. 4 shows an applications program in executable code form 214 loaded to the first processor system 310 and linked with an applications interface library 217. The host system 310 also has a communications driver 211 and a stack 414. Extended function definitions 226 are loaded in memory 220 of the graphics system 320 and are accessed by means of a command executive 221. The graphics system 320 also has a stack 423. As explained in connection with FIG. 3., communications buffer 323 provides space for passing data between processors. Argument handlers 441a and 441b, are used in connection with the packet form of extended functions.

The host-graphics interface of the invention consists of five basic parts: application interface 417, communications driver 211, command executive 221, and those core primitives 223 that are used to install extended functions. If the packet form of function definitions is used, a fifth component of the interface is an argument handler, shown as 441a and 441b.

Applications interface 217 comprises header files and an applications interface library. The header files reference core and extended function definitions 223 and 226. They also remap core and extended function calls to the appropriate entry point call. These entry point calls may be of the direct or packet type, as described above in connection with step 12, depending on the parameter types being passed to the function.

The applications interface library is linked with the application object files to form an executable application file. The applications interface library provides the means for the application program to pass information to and from communications driver 211. This is accomplished as follows: The first function call made by the application is an initialization function. This function informs communications driver 211, which is already resident in memory, to pass the starting memory of its entry point jump table. This table is a list of addresses of each communications entry point provided by communications driver 211. Once applications interface 217 is aware of the jump table address, it can jump to the appropriate entry point function called by the application.

Communications driver 211 receives data from application program 212 and sends it to communications buffer 323, which is accessible to graphics system 320. In the preferred embodiment, communications driver 211 is a terminate and stay resident (TSR) program that runs on host system 310, although the TSR configuration is not a necessary feature. Communications driver 211 is specific to the hardware of graphics system 310 and may be modified for different hardware, making the interface portable.

Figure 5:
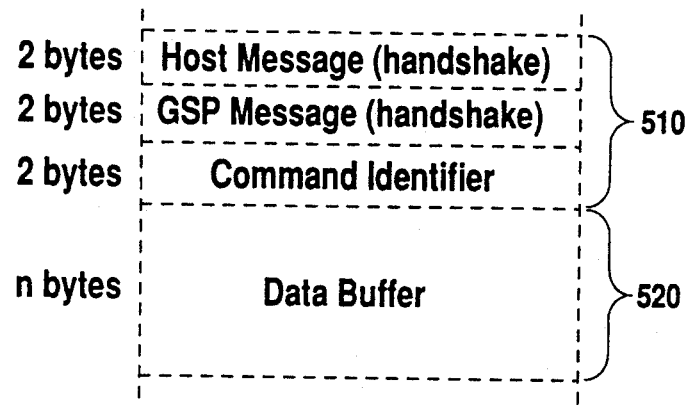
FIG. 5 illustrates the structure of the communications buffer used for communications between the host processor and the graphics processor.

A characteristic of communications driver 211 is that it permits a non-allocated buffering system, having the ability to queue several command sequences. The basic form of a communications buffer 323 used by communications driver 211 is shown in FIG. 5. The basic areas are a command buffer 510 and a data buffer 520, which are used in conjunction with a handshake routine implemented by communications driver 211. The defined messages used to communicate between the host and the graphics hardware are:

| GSP to Host communication messages | | |
|---|---|---|
| GSP_IDLE | equ 0 | ; GSP is waiting for command |
| GSP_BUSY | equ 1 | ; GSP is performing command |

| | | |
|---|---|---|
| GSP_FINISHED | equ 2 | ; GSP has completed command |
| GSP_UNINIT | equ 3 | ; GSP not initialized |
| Host to GSP communication messages | | |
| HST_IDLE | equ 0 | ; Host waiting for GSP |
| HST_CMD | equ 1 | ; Host has setup command ready |
| HST_INIT | equ 3 | ; Host wants GSP to initialize |

The _INIT commands are used during driver initialization.

Referring again to FIG. 5, the message fields are used to process commands as follows:

(1) Host places parameters for the function being called into the data buffer. It also writes the command identifier for this function into the command identifier field. This identifier specifies the type of entry point call being made, using either the direct or packet method, the module number corresponding to the DLM containing the function being called, and a function number that identifies the appropriate function within the DLM. This host then sets the HST_CMD message in the message field.

(2) GSP sets GSP_BUSY in the GSP message field and executes the command.

(3) GSP clears COMMAND_PENDING in the host message field and sets GSP_FINISHED message in the GSP message field.

(4) Host checks for the GSP_FINISHED message, and clears it before reading any return parameters or re-using the buffer.

The handshake is performed using two words, one word for the messages from the host, and one for messages from the GSP. The host has the responsibility of clearing any message from the GSP, and the GSP clears host messages. This ensures a full handshake without the need to send "message acknowledged" and "acknowledgement acknowledged" type messages back and forth. Because memory is used, the system is not limited to the number of command queues that can be active at one time.

Referring again to FIG. 4, command executive 221 is a software program that, in general, takes data from host system 310 and instructs graphics processor 321 to perform graphics operations. Typically, command executive 221 resides in RAM of memory 220 and is loaded after power up, although this is not a requirement. Like communications driver 211, command executive 221 may be modified so that the interface can be ported to different hardware systems.

Command executive 221 runs on graphics system 310 as a slave to communications driver 211, handling the GSP side of the host-GSP handshaking, receiving commands sent by the host, determining whether they are packet method or direct method commands, and invoking the function called thereby. For direct mode commands, command executive 221 sets up a global pointer to the parameter data for the function and invokes the function. For packet commands, command executive 221 invokes argument handler 441b, which uses the same global data pointer as the direct method and reformats the data as explained above. Core primitives and assembly language functions may be called in the same manner.

The argument handler program contained in argument handlers 441a and 441b is a special argument passing program that performs the run time tasks of removing the arguments from the stack 414 of host system 310 and passing them to graphics system 320, and of reassembling them after they have been passed so that they may be pushed in high level language format to the stack 423 of graphics system 320. In the embodiment of FIG. 4, argument handlers reside on systems 310 and 320, and are designed for one way communication. It should be understood, however, that the argument handlers could be symmetrical, permitting two way parameter exchanges. Each argument handler would then be capable of both parsing packets from a stack, as well as reassembling packets to push to a stack. Furthermore, in an integrated multiprocessor system, there might be a single argument handler for all processors in the system. Thus, in FIG. 4, argument handler 441a is linked to communications driver 211, and is in communication with stack 414. Argument handler 441b is linked to command executive 221, and is in communication with stack 423.

For programming convenience, the interface may also comprise certain include files to avoid repetitive definitions. These include files may be split into two groups: (1) those that are included in source files designed to run on host system 310, and (2) those that are included in source files that are run on graphics system 320. The first group of include files is part of applications interface 412 and the second group is used to build the graphics system 320, shown in FIG. 2 with the reference numeral 225. The include files for host system 310 are:

| | |
|---|---|
| extend.h | for calling extended primitives |
| graphics.h | for defining data types used with the packet method |
| typedefs.h | for any structure definitions used in connection with the interface |

The include files 225 for the graphics system 320 are:

| | |
|---|---|
| gspextend.h | external declarations of extended primitives |
| gspglobals.h | external declarations of all global variables |
| gspregs.h | graphics system register definitions |
| gspgraphics.h | external declarations of all core primitives |

As indicated above in connection with communications driver 211 and command executive 221, a feature of the invention is that it is not hardware dependent. In part, this feature is implemented with an inquiry function that is part of core primitives 224, and does not require the modification of communications driver 211 or command executive 221. The function permits an application program to determine the configuration of graphics system 320, returning such information as pixel depth in bits, horizontal and vertical resolution, and the amount of random access memory on the graphics system. The application program may then scale its output to fit any display resolution.

Appendix A is an example of one implementation of this hardware independent feature, using two functions, get_config and set_config. The function, get_config, returns a structure containing all board and mode specific information. The set_config function sets the graphics mode selected by the index passed to the default graphics mode, in which the board remains until a subsequent call to set_config is made. Referring to Appendix A with respect to set_config, if the graphics_mode argument is valid, the function sets up a new graphics mode and initializes appropriate GSP registers. If the init_draw flag is true, the function initializes the drawing environment.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description. It is, therefore, contemplated that the appended claims will cover such modifications that fall within the true scope of the invention.

What is claimed is:

1. A method of providing extended graphics functions for execution by a multiprocessor system having both a host processor system executing a main application program and a graphic processor system executing a graphics program including core primitive graphics functions, comprising the steps of:
   converting an extended graphics function subprogram source code into an executable form subprogram source code into an executable form subprogram executable by the graphics processor system, and partially linking the executable form subprogram such that internal references are resolved;
   storing said executable form partially linked subprogram in the host processor system;
   downloading said executable form partially linked subprogram to the graphics processor system from said host processor system via a communications driver;
   receiving said downloaded subprogram at the graphics processor system via a command executive;
   linking said downloaded subprogram to the core primitive graphics functions loaded on the graphics processor system via a linker executing on the graphics processor system such that external references are resolved;
   storing said downloaded and linked subprogram in a memory of the graphics processor system;
   calling an extended graphics function from the main application program executing on the host processor system;
   transmitting said extended function call from the host processor system to the graphics processor system via said communications driver;
   receiving said extended function call from the host processor system at the graphics processor system via said command executive;
   performing said extended graphics function on the graphics processor system by executing said downloaded and linked subprogram.

2. The method of claim 1, wherein the steps of downloading said executable form partially linked subprogram and linking said downloaded subprogram occur upon initialization of the main application program on the host processor system.

3. The method of claim 1, wherein the steps of downloading said executable form partially linked subprogram and linking said downloaded subprogram occur upon calling the extended graphics function corresponding to the subprogram by the main application program being executed on the host processor system.

4. The method of claim 1, wherein:
   said extended graphics function subprogram source code is in a high level language; and
   wherein said step of converting the extended graphics function subprogram source code into an executable form subprogram consists of compiling the extended graphics function subprogram source code.

5. The method of claim 1, wherein
   said extended graphics function subprogram source code is in an assembly language; and
   wherein said step of converting the extended graphics function subprogram source code into an executable form subprogram consists of assembling the extended graphics function subprogram source code.

6. The method of claim 1, wherein the extended graphics function has at least one argument specifying data required for performing the extended function, and wherein:
   said step of transmitting said extended function call from the host processor system to the graphics processor system via said communications driver includes transmitting the at least one argument; and
   said step of receiving said extended function call from the host processor system at the graphics processor system via said command executive includes receiving the at least one argument.

7. The method of claim 1, wherein the graphics processor system is connected to and controls a display, said method further including the steps of:
   calling a inquiry function from the main application program executing on the host processor system;
   transmitting said inquiry function call from the host processor system to the graphics processor system via said communications driver;
   receiving said inquiry function call from the host processor system at the graphics processor system via said command executive;
   performing said inquiry function on the graphics processor system by transmitting inquiry response data indicating display pixel depth in bits and the display horizontal and vertical resolution from said graphics processor system to said host processor system via said command executive;
   receiving said inquiry response data from the graphics processor system at the host processor system via said communications driver; and
   scaling a display outlet of the main application program to fit a display corresponding to said inquiry response data.

8. A method of providing extended graphics functions for execution by a multiprocessor system having both a host processor system executing a main application program and a graphics processor system executing a graphics program including core primitive graphics functions, comprising the steps of:
   storing the main application program having at least one call to said extended graphics function in the host processor system;
   storing an executable form partially linked subprogram in the host processor system, said executable form partially linked subprogram having at least one call to the core primitive graphics functions, being in a executable form subprogram executable by the graphics processor system, and partially linked such that internal references are resolved;
   downloading said executable form partially linked subprogram to the graphics processor system from said host processor system via a communication driver;

receiving said downloaded subprogram at the graphics processor system via a command executive;

linking said downloaded subprogram to the core primitive graphics functions loaded on the graphics processor system via a linker executing on the graphics processor system such that external references are resolved;

storing said downloaded and linked subprogram in a memory of the graphics processor system;

calling an extended graphics function from the main application program extending on the host processor system;

transmitting said extended function call from the host processor system to the graphics processor system via said communications driver;

receiving said extended function call from the host processor system at the graphics processor system via said command executive;

performing said extended graphics function on the graphics processor system by executing said downloaded and linked subprogram.

9. The method of claim 8, wherein:

said steps of downloading said executable form partially linked subprogram and linking said downloaded subprogram occur upon initialization of the main application program on the host processor system.

10. The method of claim 8, wherein:

said steps of downloading executable form partially linked subprogram and linking said downloaded subprogram occur upon calling the extended graphics function corresponding to the subprogram by the main application program being executed on the host processor system.

11. The method of claim 8, wherein the extended graphics function has at least one argument specifying data required for performing the extended function, and wherein:

said step of transmitting said extended function call from the host processor system to the graphics processor system via said communications driver includes transmitting the at least one argument; and said step of receiving said extended function call from the host processor system at the graphics processor system via said command executive includes receiving the at least one argument.

* * * * *